UNITED STATES PATENT OFFICE.

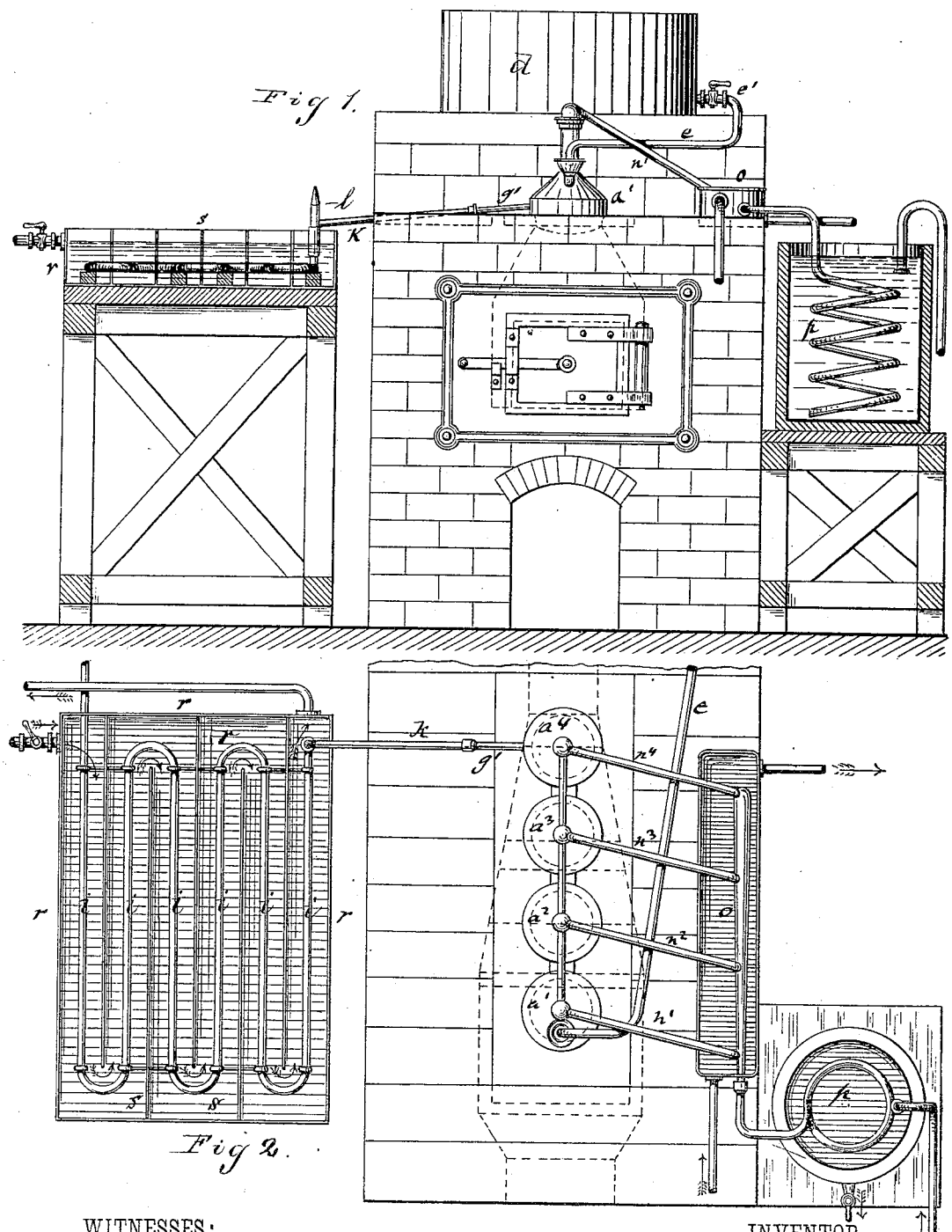

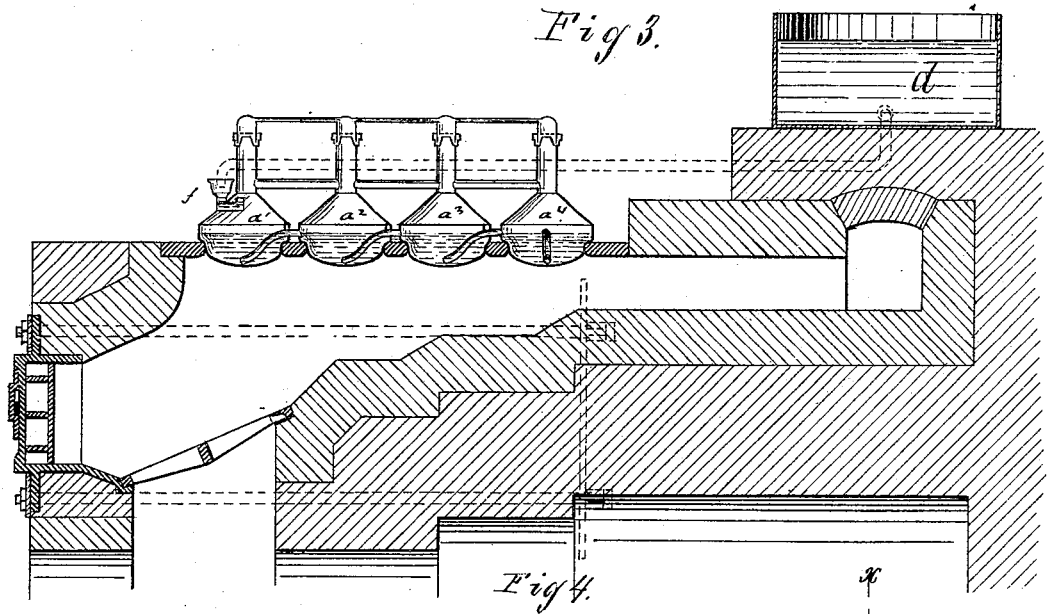
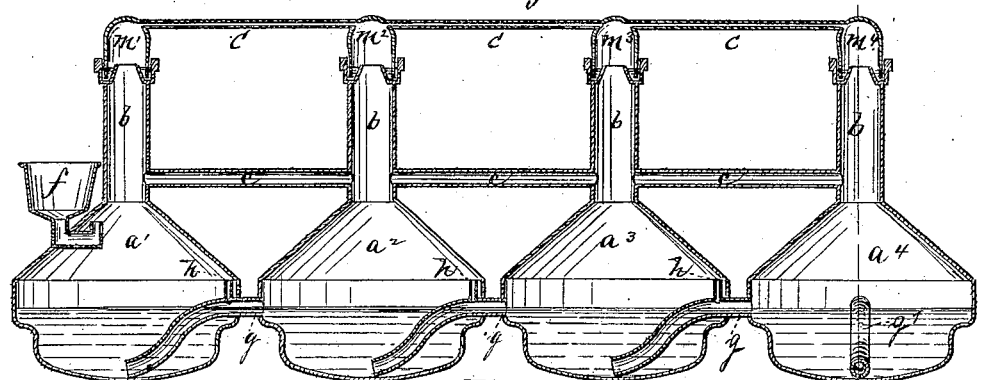
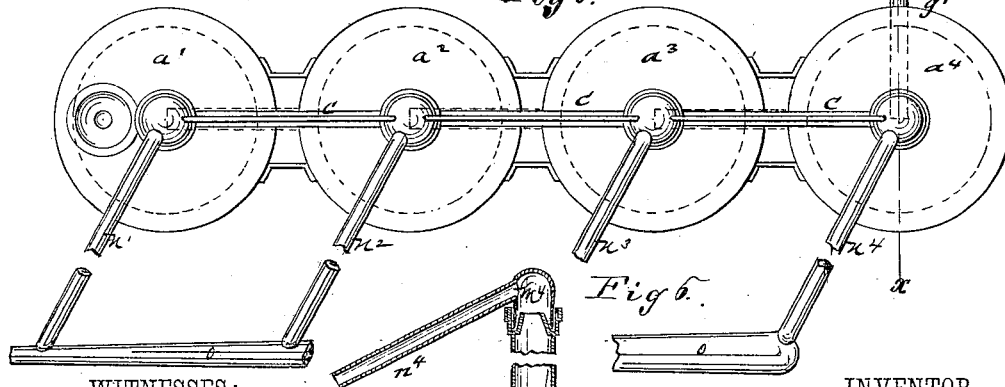
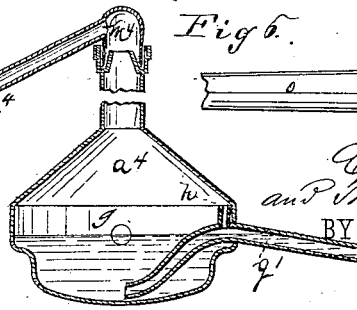

CÄSAR KOLBE AND THEODOR LINDFORS, OF ST. PETERSBURG, RUSSIA.

APPARATUS FOR CONCENTRATING SULPHURIC ACID.

SPECIFICATION forming part of Letters Patent No. 246,396, dated August 30, 1881.

Application filed June 15, 1881. (No model.) Patented in Russia April 3, 1881.

*To all whom it may concern:*

Be it known that we, CÄSAR KOLBE and THEODOR LINDFORS, both of the city of St. Petersburg, in the Empire of Russia, have invented certain new and useful Improvements in Apparatus for Concentrating Sulphuric Acid, of which the following is a specification.

The concentration of the ordinary sulphuric acid of commerce, or "chamber-acid," (*Kammersäure,*) has heretofore been accomplished in large platinum retorts or pans, which were covered by lead hoods, that served for the purpose of protecting the workmen against the injurious influence of the gases developed during the boiling of the acid. The covering-hood also served for conducting the products of distillation—to wit, the vapors of the lighter acid and water—given off during the process of concentration into the cooler for condensation. In the apparatus referred to the concentration of the acid took place in the pan or retort by one boiling operation, which was, however, connected with a number of imperfections, of which the following are the most important: First, the pans or retorts heretofore in use were very expensive, owing to their large size, they costing from ten to twenty thousand dollars; secondly, in the ordinary concentration of the acid the pans or retorts are injured, but, as is shown by experience, not by the action of the sulphuric acid, but by the action of the nitric compounds, which are always contained in the ordinary sulphuric acid of commerce, and which so far have not been successfully removed therefrom; thirdly, the use of lead covers or hoods above the platinum pans or retorts has the disadvantage that the inside of the hoods forms a large cooling-surface, upon which the concentrated acid is condensed and collected in drops, which pass back into the boiling acid and discolor it by lead compounds; further, the concentration of the acid by one boiling operation to the required degree of concentration requires a large quantity of fuel.

All the disadvantages referred to are intended to be obviated by our improved apparatus which forms the subject-matter of this application, and by which a continuous concentration of the acid can be kept up in contradistinction to the intermittent concentration in large quantities.

The invention consists of a series of platinum retorts, which are connected with each other by siphon-pipes, that conduct the acid from one retort to the other, said siphon-pipes having at their highest points small escape-tubes for the vapors, and are closed by platinum hoods, which are connected to the necks of the retorts by hydraulic seals. The last retort of the series is connected by a conduit-pipe with a cooler, which is provided with a conically-tapering escape-pipe having an opening at the apex for the escape of the vapors.

In the accompanying drawings, which fully illustrate our invention, Figure 1 represents a front elevation, partly in section, of our improved apparatus for concentrating sulphuric acid. Fig. 2 is a plan view. Fig. 3 is a vertical longitudinal section; Fig. 4, a detail vertical longitudinal section of the series of connected retorts; Fig. 5, a plan view of the same; and Fig. 6, a detail vertical transverse section of a retort on line $x$ $x$, Figs. 4 and 5.

Similar letters of reference indicate corresponding parts.

The essential characteristics of our improved apparatus consist in the arrangement of a series of small retorts, $a'$ $a^2$ $a^3$ $a^4$, which are connected by siphon-pipes $g$, that extend, respectively, from the bottom of one retort upward and through the wall of the retort to the side of the next adjoining one, the upper end of each pipe $g$ being connected to the body of the retorts by a solder of fine gold. The upper ends of the pipes $g$ are arranged on a level with the surface of the acid in the retort. The ordinary sulphuric acid of commerce is supplied to the first retort and from the same to the remaining retorts of the series from a tank, $d$, from which it is conducted, through a lead pipe, $e$, and faucet $e'$, to a funnel, $f$, of the first retort, and from the same through a U-shaped pipe, $f'$, to the interior of the retort $a'$, the U-shaped pipe forming, with the acid, a hydraulic seal, by which the escape of the vapors formed in the apparatus is prevented. The last retort, $a^4$, of the series is connected by a pipe, $g'$, which, like pipe $g$, extends from the bottom of the retort up to level of the acid, and passes thence to the outside, to a connecting-pipe, $k$, and to a cooler arranged at one side of the concentrating-retorts.

The retorts $a'$ $a^2$ $a^3$ $a^4$ are provided with cylindrical necks $b$, which are closed at the upper end by platinum hoods $m'$ $m^2$ $m^3$ $m^4$, the necks and hoods being connected by horizontal platinum pipes $c$ $c$. The hoods communicate, further, by pipes $n'$ $n^2$ $n^3$ $n^4$, with a collecting-pipe, $o$, that is placed into a vessel with cold water, which communicates again with a coil, $p$, placed in a cooling-tank arranged at the side of the apparatus. The vapors which are formed in the retorts are condensed in the collecting-pipe $o$ and coil $p$, and are conducted into a suitable vessel placed below the discharge-opening of the coil.

To prevent any escape of vapors each hood $m$ is seated into an annular trough of each neck $b$, which forms a funnel-shaped receiver, to which the hoods are soldered, the space at the inside of the hoods being filled with condensed acid, which forms a hydraulic seal for the hoods. Owing to their connection by the upper tubes, $c$ $c$, the hoods can be removed or replaced on the retorts in a convenient manner, they forming, together with the pipes $m$, the collecting-pipe $o$, and the coil $p$, one connected system for condensing the vapors.

To secure the regular passage of the acid from one retort into the other and finally to the cooler, each connecting-pipe $g$ and $g'$ is provided at the highest points, but inside of each retort, with a small vertical tube, $h$, which serves for the escape of the vapors from the upper parts of the siphon-pipes $g$ $g'$. The acid, which is concentrated to the required degree of strength—to wit, 66° Baumé—is conducted from the last retort of the series, through the pipes $g'$ and $k$, into a system of coils, $i$, which are supported in a cooling-vessel, $r$, that is divided by vertical partitions $s$, parallel to the pipes $i$, into several sections, through which the cooling water passes in an opposite direction to that of the acid in the pipes, as indicated by arrows in Fig. 1.

At the point where the pipe $k$ is jointed to the series of coils $i$ is arranged a vertical pipe, $l$, which is of conical shape at its upper end, and has a small opening at its apex for the escape of the vapors.

The series of retorts is heated by a furnace of any suitable construction, that shown in the drawings having been found by practical experience to be fully adapted for the purpose, as it also heats up the acid in the tank $d$ preparatory to its being delivered to the retorts. The series of connected retorts are simply placed upon the openings of the furnace in the same manner as vessels in ordinary cooking-stoves.

Owing to the connection of the retorts by the siphons $g$, there is a continuous passage of concentrated acid from one retort to the adjoining ones in proportion to the supply of the ordinary acid through the funnel $f f'$. Consequently a continuous concentration takes place in the retorts in place of the large quantities heretofore boiled at a single operation in one larger retort.

All parts of the apparatus which are brought in contact with concentrated acid are made of platinum, while the tank $d$, pipe $e$, and coil $p$ are made of lead. Consequently the acid is obtained in a perfectly clear state without discoloration.

Notwithstanding the great number of parts which are made of platinum, the apparatus, owing to its comparatively smaller size, is considerably cheaper than the common platinum pans heretofore employed, while, owing to the continuous process, about one-third more of concentrated acid can be produced within a given time than with the old apparatus.

As the concentration of the acid takes place continuously the nitric compounds, which evaporate at a temperature of 100° centigrade, are distilled off from the first retort, $a'$, so that the remaining retorts contain only pure sulphuric acid. The destructive action of nitrogen consequently can only take place in the first retort, which can be replaced when worn out at considerably less cost than one of the large pans of the ordinary construction heretofore in use. The continuous working of the apparatus can, furthermore, be kept up with less fuel, especially as the acid in the tank $d$ can be heated up by the gases of combustion passing off from the furnace.

Finally, it is necessary to state that all tubes used with the apparatus are not soldered but welded together by the hydro-oxygen blast.

The apparatus can be furnished in different sizes, according to the quantities of acid to be concentrated, the larger sizes of retorts having a proportionately higher productive capacity with comparatively smaller running expenses.

Having thus described our invention, we claim as new and desire to secure by Letters Patent—

1. An apparatus for concentrating sulphuric acid, consisting of a series of platinum retorts arranged on a plane and connected by pipes which extend from the bottom of one retort to a higher point of the next adjoining retort, whereby an equilibrium of level is obtained in all the retorts, substantially as and for the purpose set forth.

2. The combination, in an apparatus for concentrating sulphuric acid, of the retorts $a$, connected by pipes $g$, and having necks $b$, with sealed hoods $m$, the necks and hoods being connected by pipes $c$ $c$, substantially as set forth.

3. In an apparatus for concentrating sulphuric acid, a series of retorts, $a$, having connecting siphon-pipes $g$, and a discharge-pipe, $g'$, the pipes $g$ $g'$ being provided at the inside of the retorts with short vertical vapor-pipes $h$, substantially as specified.

4. In an apparatus for concentrating sulphuric acid, the combination of a series of retorts, $a$, connected by pipes $g$ with a discharge-pipe, $g'$, tube $k$, vertical vapor-discharge pipe $l$, and cooling-coils $i$, substantially as and for the purpose set forth.

In testimony that we claim the foregoing as our invention we have signed our names, in presence of two witnesses, this 14th day of May, 1881.

CÄSAR KOLBE.
   THEODOR LINDFORS.

Witnesses:
 H. ECKARDT,
 GEORG GABLER.